United States Patent [19]

Kato

[11] 4,390,176
[45] Jun. 28, 1983

[54] SHEET CLAMPING DEVICE
[75] Inventor: Toshifumi Kato, Tokyo, Japan
[73] Assignee: Ricoh Company, Ltd., Japan
[21] Appl. No.: 199,955
[22] Filed: Oct. 23, 1980
[30] Foreign Application Priority Data
Oct. 24, 1979 [JP] Japan ................... 54-137427
[51] Int. Cl.³ .................. B65H 5/12; B65H 5/14
[52] U.S. Cl. .................. 271/270; 101/411;
271/4; 271/277; 346/138
[58] Field of Search ............ 271/277, 82, 270, 276,
271/247, 3, 4; 346/138; 101/409, 410, 411, 246

[56] References Cited
U.S. PATENT DOCUMENTS

| | | | |
|---|---|---|---|
| Re. 19,591 | 5/1935 | Crafts et al. | 101/409 |
| 1,803,133 | 4/1931 | Ranger | 346/138 |
| 4,033,575 | 7/1977 | Fujimoto | 271/277 X |
| 4,252,307 | 2/1981 | Korte | 271/276 X |
| 4,280,693 | 7/1981 | Matsuhisa et al. | 271/277 X |

*Primary Examiner*—Bruce H. Stoner, Jr.
*Attorney, Agent, or Firm*—Guy W. Shoup; Gerard F. Dunne

[57] ABSTRACT

A sheet clamping device is provided which is used to clamp both the leading and the trailing end of a sheet while the sheet is being disposed around the peripheral surface of a drum rotating in a given direction. The drum is provided with a front and a rear claw which are adapted to clamp the leading and the trailing end of the sheet, respectively, and which are urged to bear against the peripheral surface of the drum. The claws are operated to open or close in response to respective claw operating means. After a sheet has its leading end clamped to the drum surface by means of the front claw, combing urges the sheet against the drum surface while combing it, and the trailing end of the sheet is clamped to the drum by means of the rear claw.

31 Claims, 12 Drawing Figures

SHEET CLAMPING DEVICE

BACKGROUND OF THE INVENTION

This invention relates to a sheet clamping device in which a sheet is disposed around the peripheral surface of a drum rotating in a given direction. A variety of apparatus are known and in practical use which dispose a sheet cut to size, such as a print sheet used in a printer, an original to be transmitted or a record sheet used in a facsimile system or a sheet-shaped photosensitive member used in a copying machine, around the drum and hold it thereon.

In one type of such sheet clamping device, both the leading and the trailing end of a sheet are held against the drum surface by mechanical dumping elements. The members which hold the leading and the trailing end of the sheet are independently operable, and are urged to hold the sheet against the drum surface. When a sheet is to be disposed around and held on the drum, the latter is in continuous rotation at a relatively low speed.

When the drum around which a sheet has been disposed and held is switched to a high speed operation, a centrifugal force after causes the sheet clamping members to be moved away from the drum surface to cause a reduction in the sheet holding action thereof, thereby allowing the sheet to be disengaged from the drum surface. Such an inconvenience can be avoided by increasing the resilience with which the clamping members are urged. However, if the resilience of a spring, for example, which urges these members, is increased, there results another inconvenience in that a force of an increased magnitude is necessary to open the clamping members.

The clamping members may be opened or closed by means which may comprise a combination of a cam and a cam follower. Specifically, this means typically comprises a cam which follows the rotation of the drum and which can be selectively stopped while the drum continues to rotate, and a cam follower substantially integral with a clamping member which is pivotally mounted on the drum and engaging the cam. The cam is stopped at a given location whenever it is desired to open the clamping member. Since the drum continues to rotate at this time, the cam follower moves along the stationary cam, thereby opening the clamping member. When the leading end of a sheet is fed into the space between the open clamping member and the drum surface, the cam follower then operates to close the clamping member. At this time, the cam causes the cam follower to be driven in the same direction as the direction of rotation of the drum. However, the drum or the clamping member provided thereon may move in advance of the sheet, thus disadvantageously causing the leading end of the sheet which has once been fed into the space between the clamping member and the drum to be disengaged therefrom. Such difficulties are caused by a fluctuation in the rotational load of the drum which is in turn caused by the relative position of the cam and the cam follower as the clamping member is operated.

Of primary importance in disposing and holding a sheet around the drum is to assure that the sheet is disposed against the drum surface without any slack in the sheet. In the prior art practice, when it is desired to dispose a sheet around the peripheral surface of the rotating drum, the sheet is subjected to a combing action while its leading end is secured to the drum. This technique accomplishes the intended purpose of eliminating any slack in the sheet, but involves several difficulties when clamping the trailing end of the sheet. Specifically, if a combing member is constructed to serve as a rear clamping member simultaneously, it tends to be driven away from the drum surface under influence of a centrifugal force during the rotation of the drum, and thus a positive sheet clamping action cannot be expected. If the combing member is urged against the drum with a force of an increased magnitude, the positive sheet clamping action can be assured, but the leading end of the sheet may be forced to be disengaged from the front clamping member in the course of the combing operation. Another difficulty results when a combing member is separate from a rear clamping member. Specifically, if the combing member is arranged externally of the drum, the combing member cannot induce the trailing end of the sheet to be inserted into the space between the rear clamping member which assumes its open position and the drum surface, and cannot hold the sheet in place until the rear clamping member clamps the trailing end of the sheet. When the combing member is formed by a roller, for example, the difficulty occurs because the roller contacts the drum surface at a single point around the circumference, as viewed in the axial direction of the drum.

A conventional arrangement is provided with a sheet clamping claw which secures the leading end of a sheet. When a sheet is to be disposed around the drum, the rotational position of the drum is detected, and the sheet begins to be fed toward the drum from a sheet feeder in synchronized relationship with the movement of the sheet clamping claw. In other words, the location where the leading end of the sheet is clamped to the drum surface is fixed. For this reason, the location where the sheet clamping claw is opened in order to receive the leading end of a sheet therein, or the location where the sheet clamping operation is initiated (hereafter referred to as "first location") is fixed. A signal indicative of such position is utilized as a signal to initiate the sheet feeding operation.

Accordingly, when a button which is operated to clamp a sheet around the drum, for example, a feed initiation button, is depressed, the sheet to be disposed around the drum will immediately begin to be fed toward the sheet clamping claw if the sheet clamping claw is situated at said first location. However, if the sheet clamping claw has moved past the first location, as viewed in the direction of rotation of the drum, the drum will continue to rotate through a maximum of one revolution before the sheet clamping claw is again situated at the first location, whereupon the sheet feeding operation is initiated. Thus it will be seen that the sheet clamping operation will be initiated immediately in response to the depression of a feed initiation button or after a maximum time delay corresponding to one revolution of the drum depending on the position assumed by the sheet clamping claw at such instant.

The sheet which has been disposed around the drum is removed therefrom for delivery after the completion of a printing/copying operation. At this time, the location where the leading end of the sheet is released is also fixed. After the delivery of the sheet, another sheet is clamped to the drum. However, it will be seen that there is again a need for a waiting time mentioned above depending on the location of the sheet clamping claw.

By way of example, assume that the drum rotates at a speed of 30 r.p.m. during the sheet feeding and the delivery operation. If the rotation is started with the sheet clamping claw located past the first location, no sheet clamping operation takes place during about two seconds which is required for the drum to rotate through one revolution.

The time interval required for processing the sheet, for example, for printing or copying thereon can be reduced by increasing the drum rotation to a high value, for example, 1,500 r.p.m. or providing a plurality of printing/copying means. However, the drum rotation during the sheet feeding and the delivery operation cannot be increased to a high value, so that the proportion of the time interval required for the sheet feeding and delivery operation relative to that required for the actual printing/copying operation will increase. Thus if it is attempted to reduce the time interval for the sheet processing by increasing the speed of drum rotation during the printing/copying operation or providing a plurality of printing/copying means, the time period required for the sheet fading and delivery operation makes it difficult to reduce the overall printing/copying time.

SUMMARY OF THE INVENTION

In view of the foregoing, it is a first object of the invention to provide a sheet clamping deivce capable of positively holding a sheet clamped to a drum during its high speed rotation.

Above object is accomplished by providing a sheet clamping device comprising front claw means for clamping the leading end of a sheet around the peripheral surface of a drum; rear claw means including a pivot disposed adjacent the peripheral surface of the drum, a plurality of clamping claws spaced apart along a generatrix of the drum for holding the trailing end of the sheet against the peripheral surface of the drum, and a bracket formed substantially integrally with the claws and having their one end disposed in common on the pivot and disposed so that its free end is directed toward the central axis of the drum whenever the the claws clamp the trailing end of a sheet; cam means including a cam arranged to follow the rotation of drum normally while contacting the end of the bracket and adapted to be stopped to cause the bracket to rock at the location where the claws clamp the trailing end of the sheet; and roller means including rollers disposed between adjacent claws for combing the sheet which is held against the peripheral surface of the drum, the cam means acting to cause the claws to clamp the trailing end of the sheet while a portion of the sheet adjacent the trailing end thereof is being combed by the rollers.

In accordance with the invention, the sheet combing action is performed by the roller means, separately from the claws which clamp the trailing end of the sheet. The bracket is held in its substantially radial position while the claws are clamping the trailing end of the sheet. Since the rollers comb the sheet until the trailing end of the sheet is clamped by the claws, a reliable combing action is assured over the entire length of the sheet. Because the centrifugal force acting on the bracket does not cause the claws to be moved away from the durm surface during the high speed operation, no slack is formed in the sheet, thus providing a high reliability.

It is a second object of the invention to provide a sheet clamping device which acts to average out any fluctuation in the rotational load of the drum which may be produced as the sheet clamping members are opened and closed.

This second object is accomplished by the provision of a sheet clamping device comprising a drum around which a sheet is to be disposed, sheet clamping claws mounted on the drum and adapted to be opened and closed with respect to the drum surface, a cam mounted on the shaft of the drum for opening and closing the claws, cam locking means for locking the cam during the time the claws are opened or closed, a cam follower mounted on the claws to follow the cam surface of the cam as the latter is locked to thereby cause the claws to be opened or closed, and means for preventing the rotational load of the drum from varying during the opening or closing of the claws as the cam follower moves along the cam surface.

With the described device, a reliable sheet clamping action is assured since the drum can be prevented from rotating in advance with respect to the sheet during the time the sheet clamping claws are closed.

It is a third object of the invention to provide a sheet clamping device in which a sheet is consistently combed as the sheet is disposed around the drum while its leading end is clamped by the front claw until the trailing end is clamped by the rear claw, thereby allowing the sheet to be disposed against the drum in a tight and stable manner.

This object is achieved by the provision of a sheet clamping device including a front and a rear claw which hold the sheet against a drum and comprising a combing member which is movable toward or away from the drum surface and capable of contacting the drum surface at at least two points, and means for moving the combing member toward or away from the drum in synchronism with the rotation of the drum. In a modification, the combing member may be pivotally mounted on a shaft which is movable toward or away from the drum surface.

In accordance with the invention, the distance between the two points of the combing member as well as the timing of its operation can be chosen such that when a front one of the points (or lagging one as viewed in the direction of the rotation of the drum) is located immediately in front of the front end of the rear claw as the latter begins to be closed, the other point of contact bears against the trailing end of the sheet which is held inside the claw just prior to its complete closing as the drum rotates. In this manner, the sheet can be held against and secured to the drum surface without slack and in a stable manner. Because the claws are exposed on the drum in interrupted form, the combing member may be passed through notches between the adjacent claws, thus avoiding the combing member to ride up the claws. By supporting the combing member having the two points of contact in a manner to be rockable to the leading or lagging side with respect to the direction of rotation of the drum, any shock applied to the front end on the lagging side as the combing member passes through slits in the drum cannot cause the rear end on the leading side from bouncing from the drum surface, thereby enabling a greater stability in disposing and fixing the sheet around the drum.

It is a fourth object of the invention to provide a recording system in which the time required to feed the sheet or to remove the sheet from the drum is minimized, thereby allowing a reduction in the overall time period required for the sheet processing.

This object of the invention is achieved by the provision of a sheet clamping device for use with a drum which rotates at a low rate during a sheet feeding and delivery operation and which rotates at a higher rate during a sheet processing operation and in which sheet is fed to be disposed around and fixed against the drum before the drum is rotated at the higher rate in order to process the sheet, and is removed from the drum after the completion of the processing. This sheet clamping device comprises a sheet clamping claw adapted to be opened at a first location where a clamping operation for the leading end of the sheet is initiated and adapted to be closed at a second location where the clamping operation for the leading end of the sheet is completed, claw operating means for opening and closing the claw, feed means for feeding a sheet to the sheet clamping claw on the rotating drum at a location intermediate the first and second location, as viewed in the direction of rotation of the drum, means for detecting the rotational position of the drum, and brake means responsive to a processing complete signal and a detection signal produced by the detecting means subsequent to the completion of the sheet delivery operation for stopping the drum at a third location which is rearwardly of and inclusive of the first location.

With the present invention, the drum starts from a given position, so that no waiting time is required in clamping the sheet to the drum. When switching the drum from a high speed to a low speed rotation, the drum is temporarily stopped at the given location for a purpose of sheet delivery, and simultaneously the clamping action for the next sheet can be performed, thereby allowing a reduction in the proportion of the time interval required for the sheet feeding and delivery operation relative to the overall printing/copying time.

DESCRIPTION OF THE EMBODIMENTS

The invention will now be more specifically described with reference to embodiments in which a printing apparatus of an ink jet recording type is employed as an example of an apparatus in which a sheet is disposed around and held to a drum. In the description to follow, the term "sheet" includes a printing sheet used in the above-described apparatus or other types of printing apparatus, a master sheet in an offset printer, an original to be transmitted or a record sheet used in a facsimile system, a sheet-shaped photosensitive member or transfer sheet utilized in a copying machine or the like, inclusive of a sheet-shaped member which is cut to size and which is to be clamped to a drum.

Figure 1:
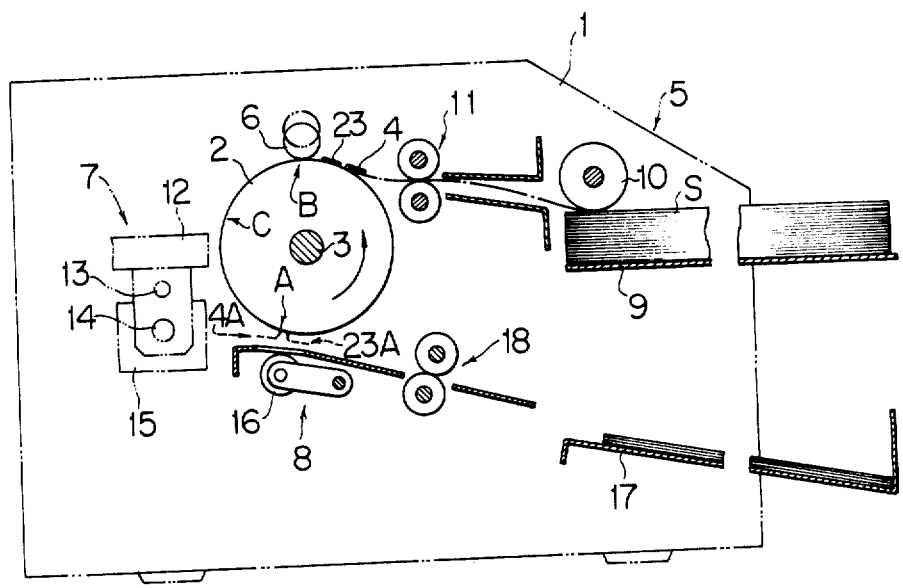
FIG. 1 is a schematic diagram of a printing apparatus of an ink jet recording type which is shown as an example of an apparatus to which the invention is applied.

Referring to FIG. 1, there is shown a printing apparatus including a casing 1 in which a drum 2 is mounted on a support shaft 3 so as to be rotatable. The drum 2 is provided with a front sheet clamping claw 4 which is adapted to hold or clamp the leading end of a sheet. Disposed around the drum are sheet feed means 5, combing roller 6, ink injection means 7 which operates as a sheet processing unit, and sheet delivery means 8 in the sequence named, as viewed in the direction of rotation of the drum indicated by an arrow.

Sheet feed means 5 includes a sheet receptacle 9 on which a number of sheets S are placed as a stack, a feed roller 10 which feeds an uppermost one of the sheets in the stack on the receptacle, and a pair of register rollers 11 which momentarily interrupts the movement of the sheet fed and delivers it in synchronized relationship with the rotation of the drum 2. In the example shown, the sheet feed means utilizes a feed roller, but it should be understood that other feed means such as suction devices may be used.

When the pair of register rollers 11 deliver the sheet, the front claw 4 has rotated to the location shown in solid line while maintaining its open position so as to permit the leading end of the sheet to pass into the open claw. At this time, the drum 2 rotates at a low rate of 30 r.p.m., for example, and the claw 4 also moves with a corresponding speed. The sheet is fed into the space between the front claw 4 and the drum surface with a speed which is slightly greater than the speed of movement of the front claw 4.

After the leading end of the sheet is received below the front claw 4, it is closed to clamp the leading end of the sheet as it moves past the combing roller 6. Subsequently the combing roller 6 combs or urge the sheet into tight adherence against the drum surface.

Although the trailing end of the sheet is also clamped to the drum, such clamping operation will be described later.

The ink injection means 7 includes an ink jet head 12 disposed close to the drum surface, a guide shaft 13, a drive shaft 14 which is formed by a threaded shaft, and a controller, not shown. Both the guide shaft 13 and the drive shaft 14 are supported to extend in parallel relationshipe with the support shaft 3 of the drum. The ink jet head 12 is caused to move in the direction of the generatrix (sub-scan direction) along the drum surface by means of the drive shaft 14 which is driven for rotation by a drive motor 15. Since on the other hand the drum 2 having the sheet disposed thereon rotates in the direction of the arrow, the ink jet head 12 moves in the scan direction relative to the drum. In response to a signal applied from a controller, the ink jet head 12 injects a small droplet of ink solution onto the sheet which is disposed on the drum surface, thus forming an image to be recorded in a dot matrix manner.

The purpose of the sheet delivery means 8 is to separate the sheet from the drum surface for delivery after a printing/copying operation has been completed. It comprises a separating roller 16 disposed to be movable toward or away from the drum 2, and a pair of delivery rollers 18 which act to deliver the sheet as separated from the drum surface onto a delivery tray 17.

Figure 2:
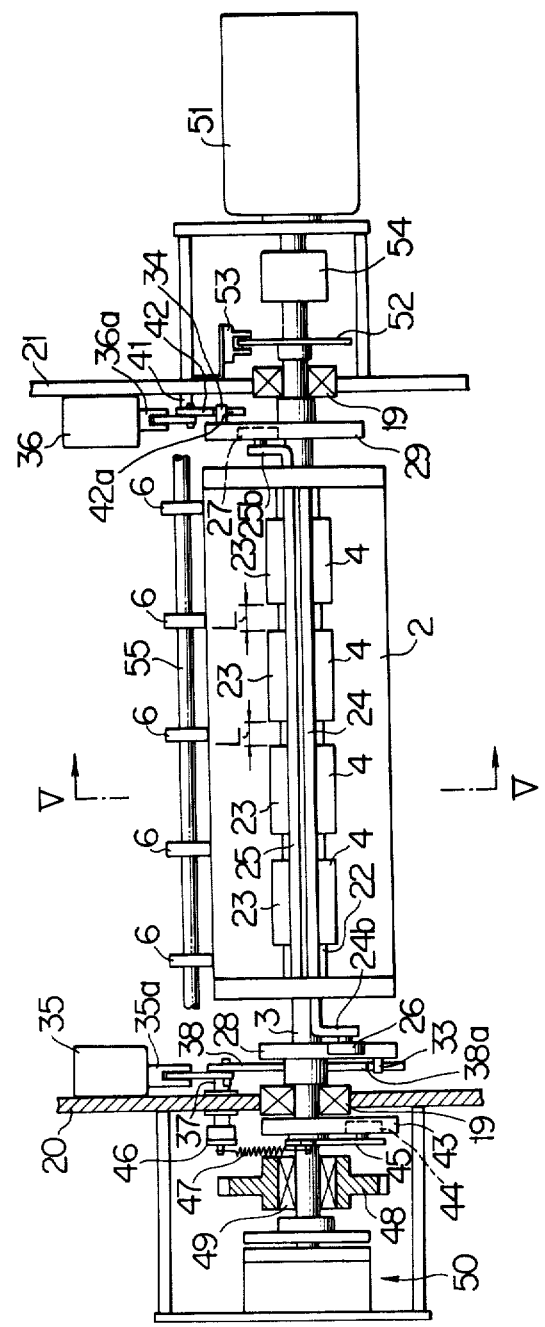
FIG. 2 is a plan view of one embodiment of the invention.

Referring to FIG. 2, the support shaft 3 of the drum 2 has its opposite ends rotatably mounted in a pair of side plates 20, 21 with bearings 19 interposed therebetween. The drum 2 is formed with a slit 22 extending along one of the generatrices of the peripheral surface. The front claw which holds the leading end of the sheet is in interrupted form and includes a plurality of claws 4 which have their one end disposed in the slit 22 and are disposed to be along portions of the drum disposed upstream of the slit 22, as viewed in the direction of rotation of the drum, while rear claws 23 which hold the trailing end of the sheet have their one end disposed in the slit 22 and lie along downstream portions of the drum.

Figure 4:
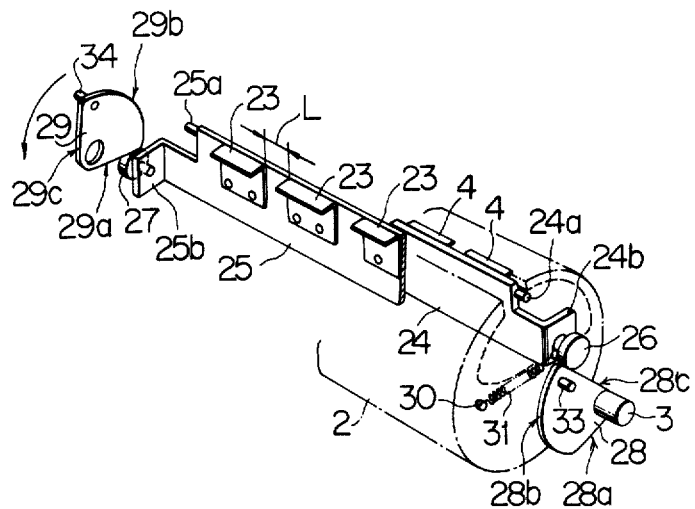
FIG. 4 is a perspective view of part of the embodiment shown in FIGS. 2 and 3.
Figure 3:
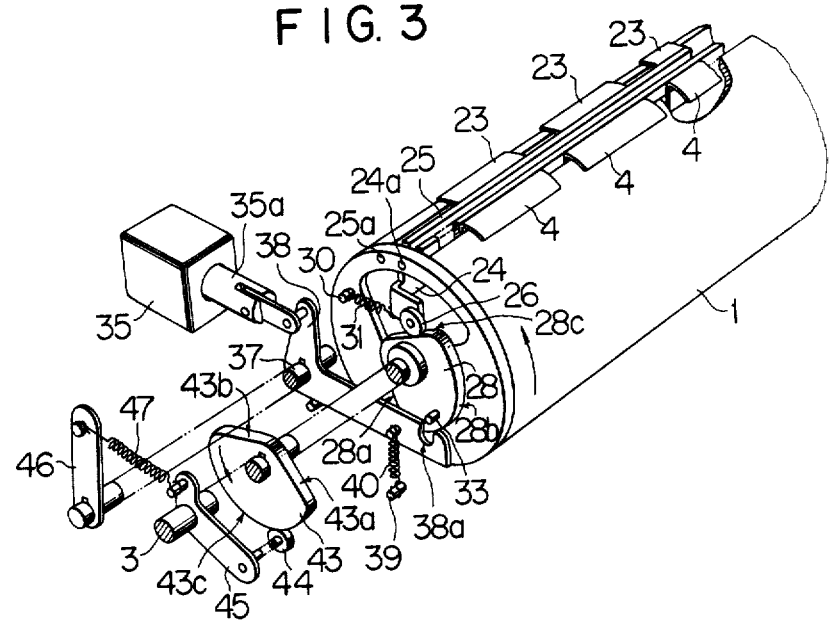
FIG. 3 is a fragmentary perspective view of the embodiment shown in FIG. 2.
Figure 5:
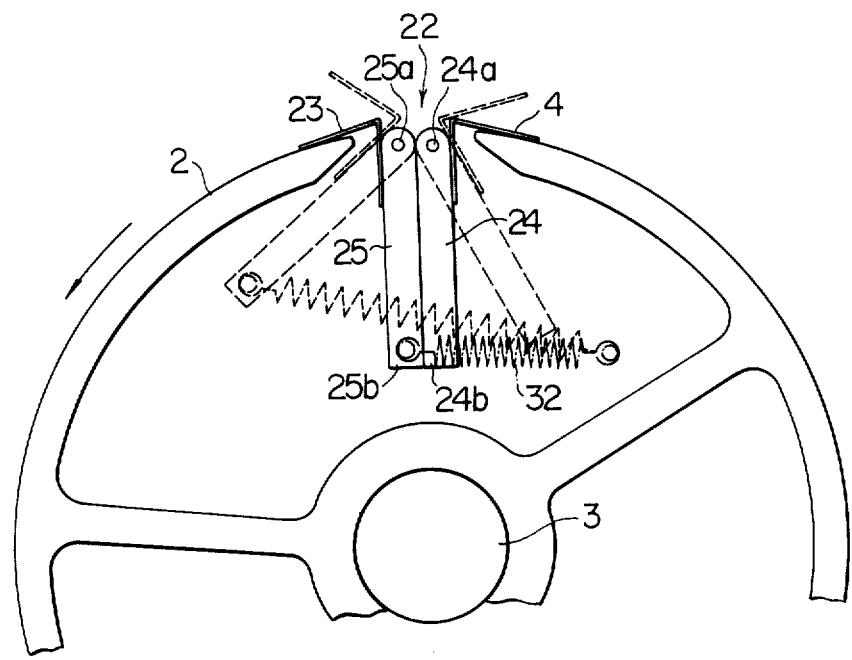
FIG. 5 is an enlarged cross section taken along the line V—V shown in FIG. 2.

Referring to FIGS. 3 and 4, it will be noted that a pair of plate-shaped brackets 24, 25 are received in the slit 22 and are each formed with pivots 24a, 25a on its opposite ends (only one end being shown), which are fitted into the end plates of the drum. The front claws 4 are secured to the bracket 24 while the rear claws 23 are secured to the bracket 25. Each of the claws 4, 23 comprises a resilient blade having a thickness on the order of 0.2 mm, for example. In the embodiment shown, four claws are secured to each bracket. It will be noted that adjacent claws are spaced apart by a spacing L. At its one end, the bracket 24 is provided with a folded portion 24b on which a cam follower 26 is pivotally mounted. Similarly, the other end of the bracket 25 is formed with a folded portion 25b on which another cam follower 27 is pivotally mounted. As shown in FIG. 4, a coiled spring 31 extends between the folded portion of the bracket 24 and a pin 30 which is fixedly mounted on the end plate of the drum. The resilience of the spring 31 causes the front claws 4 secured to the bracket 24 to rock in a direction for abutment against the drum surface. As shown in FIG. 5, another coiled spring 32 extends between the bracket 25 and the other end plate of the drum to urge the rear claws 23 in a direction for abutment against the drum surface.

As shown in FIG. 2, a pair of cams 28, 29 are rotatably mounted on the support shaft 3 of the drum intermediate the end plates of the drum and both side plates 20, 21. The cam followers 26, 27 abut against the cams 28, 29, respectively. A pair of detent pins 33, 34 are fixedly mounted on the cams 28, 29, respectively. A first and a second solenoid 35, 36 are fixedly mounted on the side plates 20, 21, respectively. The first solenoid 35 includes an actuator rod 35a which is engaged by one end of a detent lever 38 fixedly mounted on a support shaft 37 which is rotatably mounted in the side plate 20. As shown in FIG. 3, the other end of the detent lever 38 is formed with a recess 38a. A helical spring 40 extends between the lever 38 and a pin 39 fixedly mounted on the side plate 20, and normally urges the lever to move the recess 38 out of the path of rotation of the detent pin 33 on the cam 28. The first solenoid 35 is adapted to be energized when the front claws 4 are to be opened at the first location A (see FIG. 1), thereby causing the detent lever 38 to rock into engagement with the pin 33, thus stopping the cam 28. When the cam 28 remains stationary, the cam follower 26 rolls along the cam profile to cause an oscillation of the bracket 24, thus opening the front claws 4, as will be further described later. The second solenoid 36 includes an actuator rod 36a having one end of a detent lever 42 pivotally mounted thereon which is in turn pivotally mounted on a support shaft 41 which is secured to the side plate 21. The other end 42a of the detent lever 42 is located on the path of rotation of the detent pin 34 as the second solenoid 36 is energized, but normally assumes a position which is retracted out of the path of rotation under the resilience of a spring, not shown. The second solenoid 36 operates through the detent lever 42 to lock the cam 29 against movement, thereby allowing the rear claws 23 to be opened as will be further described later.

Referring to FIGS. 2 and 3, a load cam 43 is also fixedly mounted on the support shaft 3. A follower lever 45 is also loosely fitted over the support shaft 3 and has a cam follower 44 pivotally mounted on its one end. On the other hand, a lever 46 is fixedly mounted on the support shaft 37 and has its free end connected with one end of a tension spring 47, the other end of which is anchored to the other end of the follower lever 45. Normally when the first solenoid 35 is deenergized, the spring 47 assumes an unstressed condition, whereby the cam follower 44 gently bears against the profile of the load cam 43. Under this condition, no increase in the rotational load of the support shaft 3 results if the cam follower 44 bears against a portion 43c of the load cam 43 which has an increased diameter.

Referring to FIG. 2, a gear 48 is mounted on the left-hand end of the support shaft 3 with a one-way clutch 49 interposed therebetween in order to permit a rotation of the drum 2 at a low speed during a sheet clamping/unclamping operation. It is to be understood that the gear 48 is connected to a drive mechanism, not shown. The one-way clutch 49 operates to transmit a power in a direction from the gear 48 to the support shaft 3, but fails to provide any transmission from the support shaft 3 to the gear 48. An electromagnetic brake 50 is also mounted on this end of the shaft in order to apply a braking effort to the drum when converting the drum 2 from its high speed to its low speed rotation. The brake 50 is supported by the side plate 20.

Figure 7:
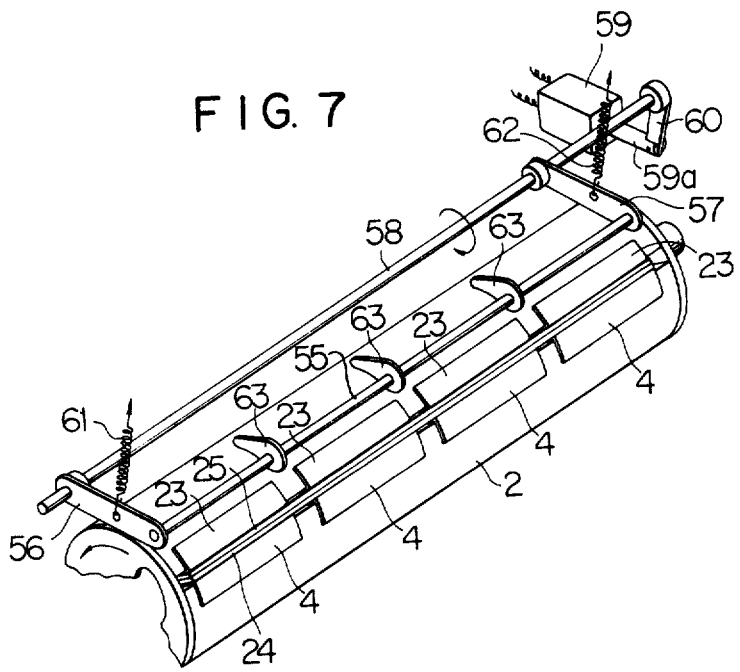
FIG. 7 is a fragmentary perspective view of another embodiment of the invention.
Figure 6A:
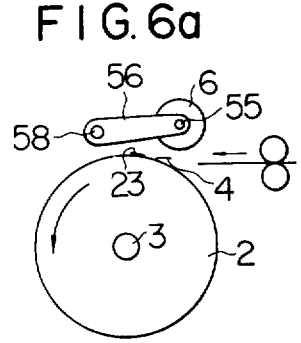
FIGS. 6A to 6C are a series of side elevations illustrating the operation of the device according to the invention.
Figure 6B:
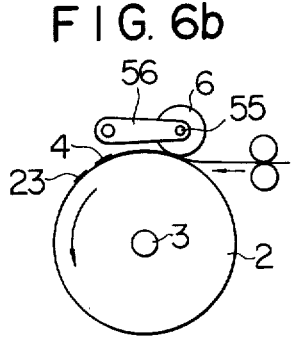
Figure 6C:
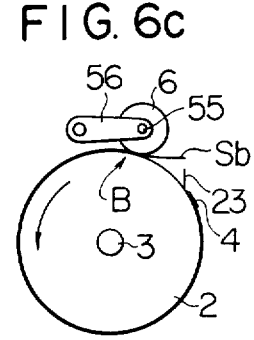

In FIG. 2, the right-hand end of the support shaft 3 is directly coupled with a scan motor 51 through a shaft coupling 54. The scan mmotor 51 is adapted to rotate at a high speed, for example, at 1,500 r.p.m. A disc 52 is fixedly mounted on the shaft 3, and is provided with a circular hole or other suitable mark at a given location so that the hole or mark can be read by a detecting switch 53. The combination of the detecting switch 53 and the disc 52 constitutes together means for detecting the rotational position of the drum 2 and which produces a signal which is effective to operate the first and the second solenoid 35, 36 selectively to stop the cams 28, 29, thus opening or closing the front and rear claws 4, 23. In the present embodiment, the combing roller 6 comprises five roller elements which are spaced apart and fixedly mounted on a single support shaft 55 as shown in FIG. 2. Of these roller elements, the centrally situated three elements are positioned to be located between adjacent sheet clamping claws which are spaced apart by a distance L. As shown in FIGS. 6A–6C, the opposite ends of the support shaft 55 are rotatably carried by one end of support arms 56, 57 (FIG. 7). While FIG. 7 illustrates another form of combing means, a support mechanism and a drive mechanism for the combing means remain the same, so that reference will be made to FIG. 7 for the description of the arrangement of the support arms. Specifically, the other end of these support arms 56, 57 is fixedly mounted on a drive shaft 58, which extends across and is rotatably supported by the side plates 20, 21. A lever 60 has its one end fixedly mounted on one end of the drive shaft 58 and has its other end connected to an actuator rod 59a of a third solenoid 59. Helical springs 61, 62 have their one end connected to both support arms 56, 57, respectively, thereby urging the combing roller 6 in a direction away from the drum surface.

The relationship between the rotational position of the drum and the sheet clamping claws will be considered next. In FIG. 1, the drum 2 rotates counterclockwise at a low speed during a sheet clamping operation. When the front claws 4 move to the first location indicated by a letter A, the cam follower 26 rides up the cam 28 which remains stationary, thereby opening the claws 4. After the leading end of the sheet S is fed into the clearance between the open claws 4 and the drum surface, the cam follower 26 moves along the cam profile to cause the front claws 4 to be closed as the latter reaches the second location B. This completes the clamping of the leading end of the sheet. Subsequently, the sheet having its leading end clamped is brought into tight adherence against the drum surface by the combing roller 6. The rear claws 23 are opened at the first location A, and when they reach the second location B, the trailing end of the sheet which is being combed by the roller 6 moves into the clearance between the claws 23 and the drum surface, whereupon the claws 23 are closed. This completes the disposition of the sheet around and its clamping to the drum 2. Subsequently, the drum 2 is switched to a high speed operation for allowing the injection of droplets of an ink solution onto the sheet thus disposed. After the completion of a printing/copying operation, the drum rotation is switched to a low speed, and the front claws 4 are initially opened at the first location A, thus releasing the leading end of the sheet. The sheet is then directed toward the delivery roller pair 18. As the rear claws 23 rotate to the first location A, they are opened, thus releasing the trailing end of the sheet. Thereafter, before a next sheet is to be clamped, both the front and the rear claws 4, 23 rotate toward the second location B while assuming their open position. When there is no need to clamp another sheet, the rotational position of the drum is directed, and a braking effort is applied to the drum 2 in order to stop it at a point such that the front claws 4 come to a rest at a third location C which is upstream of the first location A.

In operation, assuming that a print initiation switch, not shown, is depressed in FIG. 1, the gear 48 starts a counterclockwise rotation of the drum 2 with the front claws 4 located at the third location C. Simultaneously the first solenoid 35 (FIGS. 2 and 3) and the third solenoid 59 (FIG. 7) are energized, and the feed means 5 initiates a sheet feeding operation. The feed roller 10 picks up an uppermost one of the sheets S disposed in a stack on the receptacle 9 and feeds it toward the register roller pair 11 where it is converted into a standby mode with its leading edge disposed in abutment against the roller pair 11. When the first solenoid 35 is energized, the detent lever 38, the support shaft 37 and the lever 46 moves angularly, whereby the recess 38a of the detent lever 38 is engaged with the detent pin 33 to stop the cam 28. The lever 46 acts to stretch the spring 47, thus causing the cam follower 44 on the follower lever 45 to be strongly urged against the cam edge 43c of the load cam 43. Under this condition, a bevelled cam 28a of the cam 28 is located at the first location A while its bevelled cam edge 28c is located at the second location B.

As the drum 2, support shaft 3 and load cam 43 rotate counterclockwise in an integral manner, the cam follower 26 abuts against the bevelled cam edge 28a and then rides up the cam edge 28b, whereby the bracket 24 is rocked about the pivots 24a to open the front claws 4. When the cam follower 26 abuts against the bevelled cam edge 28a, the other cam follower 44 moves down the cam edges 43c of the load cam 43 into its bevelled cam edge 43b. As mentioned previously, the front claws 4 are opened at the first location A where the clamping operation is initiated, and the open condition is maintained by the cam follower 26 which rolls around the cam edge 28b. When the drum 2 rotates to a suitable position with the front claws 4 maintained open, the rotational position detecting means (the combination of the disc 52 and the detecting switch 53) detects such position of the drum, and produces a signal which causes the register roller pair 11 to start rotating. As the register roller pair 11 rotates, the sheet S which has been maintained in its standby mode begins to be fed toward the drum surface with a speed which is slightly greater than the peripheral speed of the drum 2. When the front claws 4 reach their position shown in solid line in FIG. 1, the sheet S advances into the clearance between the claws 4 and the drum surface, with its leading edge Sa abutting against the claws 4 to be carried thereby. When the front claws 4 which carry the leading edge Sa of the sheet in abutment therewith reach the second location B, the cam follower 26 moves down the cam edge 28b into the bevelled cam edge 28c of the cam 28, whereby the resilience of the spring 38 causes the claws 4 to be closed, thus clamping the leading end Sa of the sheet between the claws and the drum surface.

It is to be noted that the rotational load of the drum 2 decreases rapidly as the cam follower 26 moves down the cam edge 28b onto the bevelled cam edge 28c. Since the force of the drive on the drum as viewed in the forward direction of its rotation increases as the inertial load applied to the shaft 3 decreases, the drum may be momentarily accelerated beyond its steady state of rotational speed, causing the drum 2 to rotate in advance of the sheet S. This may result in the failure of clamping the leading end of the sheet even though the front claws 4 have been closed, or the clamping of the sheet at an intermediate position thereof where its leading end is not disposed in abutment against the claws to thereby cause a subequent disengagement of the sheet.

In the arrangement of the invention, a loading means is provided which suppresses a fluctuation in the rotational load of the drum as mentioned above and thereby serve to assure the rotational speed of the drum remains constant. Specifically, the cam follower 44 is arranged to ride up the bevelled cam edge 43b of the load cam 43 as the cam follower 26 moves down into the bevelled edge 28c. As a result of such arrangement, the drum 2 is temporarily loaded, thus cancelling or diminishing a rapid decrease in the rotational load of the drum which occurs as the front claws 4 are being closed. In this manner, the rotation of the drum in advance of the sheet is prevented, allowing the leading end of the sheet to be properly clamped at the second location B. It will be noted that an increase in the rotational load of the drum as the cam follower 26 rides up the cam edge 28b after it has abutted against the bevelled cam edge 28a is cancelled by a decrease in the rotational load which occurs as the other cam follower 44 moves down the cam edge 43c into the bevelled cam edge 43b of the load cam 43, thus maintaining the rotation of the drum 2 uniform as a whole. When the front claws 4 are closed, the first solenoid 35 ceases to be energized, whereby the locking action of the cam 28 terminates. Subsequently, the cam 28 is urged by the cam follower 26 which bears against the bevelled cam edge 28a, whereby it rotates integrally with the drum 2.

After the leading end of the sheet S has been clamped by the front claws 4 which are closed at the second location B, the sheet is sequentially disposed around the rotating drum surface while the combing roller 6 urges it into tight adherence against the drum surface, as shown in FIG. 6b. It is to be noted that the combing roller is moved from its location away from the drum to its combing position (FIG. 6b) in response to the operation of the third solenoid 59 (FIG. 7) which is energized immediately after the front claws 4 have been closed.

When the detecting means detects that the rear claws 23 on the drum 2 have moved close to the third location C, which is upstream of rotation of the drum, after the leading end of the sheet has been clamped to the drum, the second solenoid 36 (FIG. 2) is energized. When the second solenoid 36 is energized, the detent lever 42 is rocked into engagement with the detent pin, thus stopping the cam 29. The cam 29 has been rotating integrally with the drum as a result of its being urged by the cam follower 27 until the cam 29 is locked by the detent lever 42. As the cam 29 is stopped, the cam follower 27 rides up the bevelled cam edge 29a (FIG. 4) onto the cam edge 29b, whereby the bracket 25 moves angularly about the pivots 25a to open the rear claws 23. Thus it will be seen that the cam 29 is stopped with its bevelled cam edge 29a located in a manner such that the rear claws 23 are opened at the first location A. When the open claws 23 reach the second location B, the cam follower 27 moves down the cam edge 29b into the bevelled cam edge 29c, thus closing them. At this time, the trailing end Sb of the sheet is urged against the drum surface by the combing roller 6, so that it is clamped as the rear claws 23 are closed. When the trailing end of the sheet is clamped, the deposition of the sheet around the drum as well as its clamping operation are completed. However, it is to be noted that an arrangement is made during the clamping operation of the trailing end of the sheet that the rear claws be maintained open to avoid a contact of the trailing end of the sheet with the rear claws and that the rear claws 23 be closed while the combing roller 6 holds the trailing end of the sheet, both of which are achieved by a selected positional relationshipe between the cam 29 and the cam follower 27.

When the trailing end of the sheet has been clamped, the third solenoid 59 is deenergized, allowing the combing roller to be moved away from the drum surface. Simultaneously, the second solenoid 36 is also deenergized, releasing or unlocking the cam 29.

It will be understood from the foregoing description that the sheet is combed by the roller means while the trailing end of the sheet is held separately by the rear claws. When the claws hold the trailing end of the sheet, the brackets are maintained in their substantially radial orientation, and the roller continues to comb the sheet until the claws clamp the trailing end of the sheet, so that the entire length of the sheet is reliably combed. The centrifugal force acting on the brackets during a high speed rotation of the drum cannot cause the claws to be opened, thus avoiding any diminishing effect on the clamping action to assure a high reliability of the sheet clamping device.

After delivering the sheet, the pair of register rollers 11 continue to be driven until at least the leading end of the sheet is clamped. Subsequently, the drive is interrupted and these rollers are only rotating as the sheet is being wrapped around the drum.

It will be understood from the above description that the sheet clamping operation is completed substantially during one revolution of the drum. The completion of the sheet clamping operation is detected by the detecting means, which then disconnects the transmission of the drive to the gear 48 and begins to energize the scan motor 51.

When the scan motor 51 is set in operation and the drum 2 rotates with a speed on the order of 1,500 r.p.m., a controller (not shown) associated with ink injection means 7 becomes operative to inject droplets of an ink solution from the ink jet head 12 onto the sheet disposed around the rotating drum for purpose of printing/copying operation.

After the termination of the printing/copying operation when the controller produces a signal indicative of this fact, the scan motor 51 ceases to be energized while the electromagnetic brake 50 is energized to stop the drum at such a position that the claws 4 are situated at the third location C. The scan motor 51 can be turned off at any time without regard to the rotational position of the drum 2. However, it is necessary to detect the rotational position of the drum in order to determine the timing when the electromagnetic brake 50 is to be operated in order to assure that the front claws 4 come to a rest at the third location C, or more strictly, at a location which is slightly upstream of the location C, as viewed in the direction of rotation of the drum.

When the drum 2 comes to a rest at a given position, the gear 48 is then driven to rotate the drum 2 at a speed of 30 r.p.m. When the detecting means detects the front claws 4 at the third location C, it produces a signal which is utilized to initiate the operation of the sheet feed means 5 to supply another sheet, the energization of the first solenoid 35 in order to open the claws 4, and the operation of a timer which determines the timing when to open the front claws 4.

Specifically, the feed roller 10 rotates through one revolution to separate an uppermost one of the sheets S from the stack, and feeds it until its leading end abuts against the pair of register rollers 11 whereupon the sheet is forced to assume a standby mode. When the first solenoid 35 is energized, the detent lever 38 engages the detent pin 33 to stop the cam 28. When the cam 28 is stopped, the cam follower 26 moves around the cam edge, thus acting through the bracket 24 to open the front claws 4. As will be understood, the claws 4 are opened at the first location A. When the claws 4 are opened, the leading end of the sheet which has been held by these claws is released, and the separating roller 16 rocks into abutment against the drum with the sheet interposed therebetween, immediately after the leading end of the sheet has moved past the first location A. This permits the released leading end of the sheet to be separated from the drum surface and fed toward the pair of delivery rollers 18.

After the release of the leading end of the sheet, front claws 4 move toward the position shown in solid line while being maintained open. On the other hand, the pair of register rollers 11 are driven for rotation in synchronism with such movement of the claws 4, whereby the sheet which has been maintained in its standby mode is fed into the clearance between the drum surface and the front claws 4. When the front claws 4 reach the second location B together with the sheet fed, the cam follower 26 moves along the cam edge to close the claws, thus clamping the leading end of the next sheet. At this time, it will be noted that the front claws 4 have clamped the leading end of the next sheet while the rear claws 23 continue to clamp the trailing end of the sheet being removed.

When the rear claws 23 reach the first location A, the second solenoid 36 is already energized to cause the cam 29 to be stopped through the detent lever 42 and the detent pin 34. Consequently, the cam follower 27 moves along the cam edge, acting through the bracket 25 to open the rear claws 23. As a consequence, the trailing end of the first sheet is released and delivered onto the delivery tray through the pair of delivery rollers 18. It is to be noted that the separating roller 16 is moved away from the drum surface before the rear claws 23 approach it.

After the release of the trailing end of the sheet, the rear claws 23 continue to rotate from the first location A to the second location B while maintaining their open position, and clamp the trailing end of the second sheet when the second location B is reached. The action of the combing roller during the clamping operation of the second sheet occurs in the similar manner as mentioned previously. In this manner, the second sheet is disposed around the drum.

When the detecting means detects the fact that the sheet has been disposed around the drum, the drive supplied to the gear 48 is interrupted, and the drive is then switched to the scan motor 51. Subsequently, a printing/copying operation through the injection of an ink takes place in the similar manner as mentioned previously.

After a given number of sheets have been printed or copied, and when the last sheet is delivered, the detecting means detects the rotational position of the drum to activate the electromagnetic brake 50 so that the drum 2 comes to a rest at such position that the front claws 4 are positioned at rest upstream of the third location C, which represents the start position of the drum in the arrangement of the invention.

It will be appreciated from the above description that the drum starts from a given position so that the sheet clamping operation can be initiated without involving a waiting time. When switching the drum from a high speed to a low speed rotation, the drum is once brought to a stop at the given position before the sheet delivery takes place and before the next sheet clamping operation is initiated. In this manner, the proportion of the sheet feeding and delivery time relative to the entire printing/copying time can be reduced.

During a maintenance operation, the rotational position of the drum is often changed. Thus, although the drum 2 is positioned such that the front claws are situated at the third location C after the completion of the sheet delivery, the drum is then turned angularly to change the start position. To accommodate for this, an arrangement may be made such that when a main switch of the apparatus is turned on, the detecting means detects the rotational position of the drum 2, and if it is determined that the front claws are not situated at the third location C, the gear 48 is driven to rotate the drum until such location is reached, whereupon the drum is brought to a stop. This avoids the need for a waiting time after a sheet feed command is issued.

In the above embodiment, the load cam 43 and the cam follower 44 are utilized to suppress a fluctuation in the rotational load of the drum. However, the same function can be achieved by alternate means to be described below.

In the embodiment shown, the drum 2 is driven for rotation at a low speed during the time a sheet is being disposed around or removed from the drum, as mentioned above, while it rotates at a higher speed during a printing/copying operation. Hence, when a sheet is to be disposed around the drum, the gear is driven from a low speed motor, not shown, to rotate the shaft 3 at a low speed in order to enable a sheet clamping operation. At this time, the rotation of the gear 48 is transmitted to the shaft 3 through the one-way clutch 49. On the other hand, during a printing/copying operation, the high speed scan motor 51 drives the shaft 3 through the shaft coupling 54 for rotation at a higher speed in order to enable the printing/copying operation to be completed within a reduced length of time. At this time, the one-way clutch 49 continues to slip without causing a rotation of the gear 48.

In a two-drive system as mentioned above, when the cam follower 26 moves down the cam edge onto the bevelled cam edge of the cam 28, the drum 2 tends to rotate in advance of the sheet even though the low speed motor mentioned above causes the scan motor 51 to rotate with the shaft 3 inasmuch as the scan motor represents a light load.

This difficulty may be avoided by utilizing the electromagnetic brake 50 which is originally intended to apply a braking effort to the drum when switching it from a high to a low speed rotation after the completion of a printing/copying operation. Specifically, referring to FIG. 4, the electromagnetic brake 50 may be turned on when the cam 28 remains at rest and the cam follower 26 moves up the bevelled cam edge 28c onto the cam edge 28b, rolling on an intermediate portion of the latter, and may be turned off after the cam follower 26 has moved down the cam edge 28b onto the bevelled cam edge 28a. This effectively prevents a rotation of the drum in advance of the sheet since the drum 2 is loaded by the electromagnetic brake 50 when the front claws 4 are being closed. In an alternative arrangement, the braking effort produced by the electromagnetic brake 50 may be reduced as the cam follower 26 moves up the bevelled cam edge 28c onto the cam edge 28b and increased as the cam follower 26 moves down the cam edge 28b onto the bevelled cam edge 28a. This permits a balanced rotation of the drum as a whole while simultaneously achieving the intended purpose of assuring a sheet clamping operation.

It will be understood that in a sheet clamping device of the type utilizing claw operating cams and cam followers which move in following relationship with the former, a fluctuation in the rotational load of the drum is likely to occur. In accordance with the invention, means is provided which suppresses such fluctuation to average out the rotational load so that the drum may rotate at a uniform speed. In this manner, a reliable clamping action is assured with sheet clamping claws which it will be seen and displaced from time to time as the drum rotates. Simultaneously, a balanced rotation of the drum is achieved.

In the above embodiment, the combing means is formed by the combing roller 6 which brings the sheet into a tighter adherence against the drum. It will be seen that the combing roller 6 contacts the drum surface at a single point so that there is a problem of choosing a critical timing when the trailing end of the sheet is to be held by the rear claws. Specifically, there may result a failure to clamp the trailing end of the sheet or an imperfect clamping which may subsequently allow the sheet to be slackened when the drum is switched to a high speed rotation, if the relative timing of inserting the trailing end of the sheet into the space between the rear claws and the drum surface and of holding the sheet against the drum with the combing roller until the claws clamp the sheet is wrong.

Figure 8:
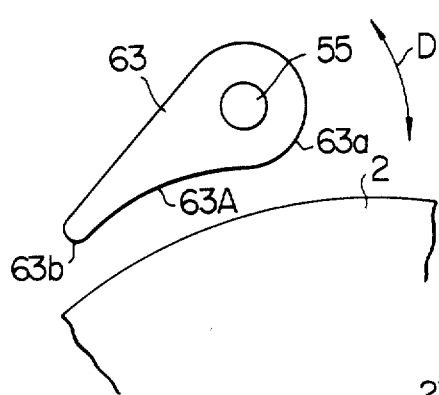
FIGS. 8 and 9 are views illustrating the operation of the embodiment shown in FIG. 7.
Figure 9:
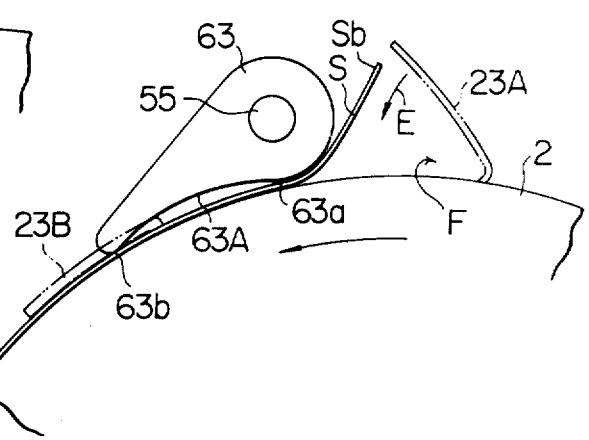

FIGS. 7 to 9 illustrate another form of sheet combing means which overcomes the problem mentioned above. Fixedly mounted on the support shaft 55, on which the combing roller 6 has been mounted in the previous arrangement, are three combing members 63 utilizing suitable means. Each of the combing members is located to be intermediate adjacent sheet clamping claws. Referring to FIG. 8, the combing member 63 has a lower surface 63A representing a curved surface having substantially the same curvature as the drum 2. It is essential that both the leading and the trailing end 63a, 63b of the lower surface be in contact with the drum surface. The support shaft 55 is disposed close to the front end 63a and extends in a direction perpendicular to the plane of the drawings or parallel to the drum and is angularly movable in a direction indicated by an arrow D. Accordingly, the combing members 63 are movable toward or away from the drum surface. FIG. 9 illustrates the combing member 63 which urges the sheet S against the drum 2, thus combing the sheet. A reference character 23A represents a rear claw 23 which serves to clamp the trailing end of a sheet and which is shown at its start position for movement in a direction indicated by an arrow E. At this time, the trailing end Sb of the sheet is adapted to be received in an opening F formed between the rear claw 23 and the drum 2 as it is urged by the front end 63a of the combing member 63 which represents its forward point of contact. As the drum further rotates, a portion adjacent the trailing end Sb of the sheet is urged by the rear end 63b of the combing member 63 which represents the other point of contact immediately before the rear claw 23 is completely closed (indicated at 23B). The combing action mentioned above can be achieved by carefully choosing the timing when the rear claw 23 is closed and the spacing between the pair of points of contact of the combing member 63 with the drum. It should be understood that the curvature of the lower surface 63A of the combing member 63 is more preferably equal to that of the curvature of the drum surface added with the thickness of the sheet.

Figure 10:
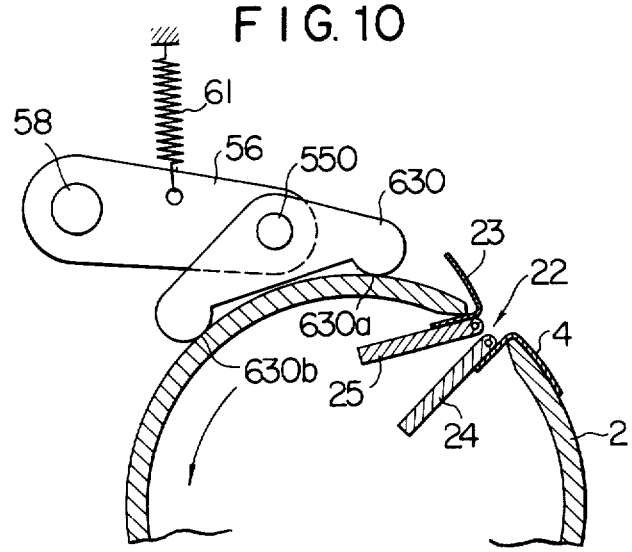
FIG. 10 is a front view of a further embodiment of the invention.

FIG. 10 shows another embodiment of the invention. In the previous embodiment, the combing members 63 have been substantially integral with the support shaft 55 while in the present embodiment, a combing member 630 is pivotally mounted on a support shaft 550. The combing member 630 shown in FIG. 10 is chevron-shaped having points of contact 630a, 630b on its opposite ends, as shown in FIG. 10, with an opening formed in the top of the chevron which is loosely fitted over the support shaft 550. The arrangement is such that as long as the third solenoid 59 (FIG. 7) is energized, the rear end 630b of the combing member 630 is maintained in pressure contact with the drum surface if the front end 630a drops into the slit 22 formed in the drum.

What is claimed is:

1. A sheet clamping device comprising a drum around which a sheet is to be disposed, drum drive means for driving the drum for rotation in a given direction, first swingable clamping means extending outwardly of the drum through a slit formed in the drum along a generatrix thereof and being swingable between an open and a closed position relative to the drum surface for clamping the leading end of a sheet against the drum surface, operating means for selectively driving the clamping means to its open or closed position, second swingable clamping means extending outwardly of the drum through the slit formed in the drum and swingable between an open and closed position relative to the drum surface for clamping the trailing end of the sheet against the drum surface, second operating means for selectively driving the second clamping means to its open or closed position, and sheet combing means movable toward or away from the drum surface for urging the sheet against the drum surface as the sheet is being disposed around the drum, in which the drum is associated with directing means for detecting the rotational position of the durm, and brake means for applying a braking effort to the drum as it rotates, and wherein the first clamping means is adapted to be brought to a stop at a third location which is lagging behind a first location where a sheet clamping operation for the leading end of the sheet is initiated and which leads a second location where a sheet clamping operation for the leading end of the sheet is completed.

2. A sheet clamping device according to claim 1 in which the first and the second clamping means each comprise an equal plurality of sheet clamping claws.

3. A sheet clamping device according to claim 2 in which the plurality of clamping claws of the first clamping means are disposed along a generatrix of the drum at a given spacing and in which the plurality of clamping claws of the second clamping means are disposed along a generatrix of the drum at the same spacing as the spacing between the clamping claws of the first clamping means.

4. A sheet clamping device according to claim 3 in which the combing means includes a plurality of combing members which are spaced apart in the axial direction of the drum and which are situated intermediate adjacent clamping claws.

5. A sheet clamping device according to claim 1 in which the drum drive means comprises a low speed drive system for driving the drum for rotation at a low speed during a sheet feeding and delivery operation, and a high speed drive system for driving the drum for rotation at a high speed during the time the clamped sheet is being processed.

6. A sheet clamping device according to claim 5 in which the high speed drive system comprises a motor directly coupled with the support shaft of the drum.

7. A sheet clamping device according to claim 1 in which the first clamping means comprises a clamping claw which clamps the leading end of the sheet, a bracket integral with the clamping claw and angularly movable about an axis which extends parallel to the axis of the drum, and a spring extending across the bracket and an end plate of the drum for urging the clamping claw in a direction to abut against the drum surface.

8. A sheet clamping device according to claim 7 in which a plurality of clamping claws of the first clamping means are secured to the bracket at a given spacing therebetween.

9. A sheet clamping device according to claim 8 in which the clamping claw of the first clamping means comprises a resilient blade.

10. A sheet clamping device according to claim 7 in which the bracket is disposed so that its free end is directed toward the center of the drum when the associated clamping means has clamped the leading end of the sheet.

11. A sheet clamping device according to claim 1 in which the first operating means comprises a cam rotatably disposed on a support shaft which supports the drum, a cam follower on the first clamping means and urged to bear against the cam, the detent means for stopping the cam at a given position.

12. A sheet clamping device according to claim 11 in which the cam associated with the first operating means has a cam edge which is shaped to open clamping claws of the first clamping means at a first location where a sheet clamping operation for the leading end of the sheet is initiated and to close the claws at a second location where the sheet clamping operation is terminated.

13. A sheet clamping device according to claim 11 in which the detent means comprises a detent pin fixedly mounted on the cam, a detent lever which may be selectively disposed on the path of rotation of the detent pin to be engageable with or disengageable from the detent pin, and a solenoid for selectively rocking the detent lever.

14. A sheet clamping device according to claim 1 in which the second clamping means comprises a clamping claw which clamps the trailing end of the sheet, a bracket integral with the clamping claw and angularly movable about an axis which extends parallel to the axis of the drum, and a spring extending across the bracket and an end plate of the drum for urging the clamping claw in a direction to abut against the drum surface.

15. A sheet clamping device according to claim 14 in which the bracket is disposed so that its free end is directed toward the center of the drum whenever the second clamping means has clamped the trailing end of the sheet.

16. A sheet clamping device according to claim 15 in which the clamping claw of the second clamping means comprises a resilient blade.

17. A sheet clamping device according to claim 14 in which a plurality of clamping claws of the second clamping means are secured to the bracket at a given spacing therebetween.

18. A sheet clamping device according to claim 1 in which the second operating means comprises a cam rotatably disposed on a support shaft which supports the drum, a cam follower on the second clamping means and urged to bear against the cam, and detent means for stopping the cam at a given position.

19. A sheet clamping device according to claim 18 in which the detent means comprises a detent pin fixedly mounted on the cam, a detent lever which is selectively disposed in the path of rotation of the detent pin to be engageable with or disengageable from the detent pin, and a solenoid for selectively rocking the detent lever.

20. A sheet clamping device according to claim 1 in which the sheet combing means comprises a combing member disposed for direct contact with the sheet, support means for supporting the combing member, and drive means for driving the support means to bring the combing member into contact with the sheet.

21. A sheet clamping device according to claim 20 in which the combing member comprises a roller mounted on a support shaft and disposed for contact with the moving sheet as it is disposed around the drum, thereby rotating in following relationship with the sheet movement.

22. A sheet clamping device according to claim 20 in which the combing member is shaped to present at least two points of contact with the drum surface which are spaced apart circumferentially of the drum.

23. A sheet clamping device according to claim 22 in which the combing member is rockably mounted on a support shaft which is movable toward or away from the drum surface.

24. A sheet clamping device according to claim 1, wherein whenever the detecting means detects that the first clamping means is not situated at the third location at the beginning of operation of the device, the drum is driven to rotate until the first clamping means reaches the third location, whereupon the drum is brought to a stop.

25. A sheet clamping device according to claim 1, including load means serving to assure the rotational speed of the drum remains constant during actuation of said first clamping means.

26. A sheet clamping device comprising a drum around which a sheet is to be disposed, drum drive means for driving the drum for rotation in a given direction, first swingable clamping means extending outwardly of the drum through a slit formed in the drum along a generatrix thereof and being swingable between an open and a closed position relative to the drum surface for clamping the leading end of a sheet against the drum surface, operating means for selectively driving the clamping means to its open or closed position, second swingable clamping means extending outwardly of the drum through the slit formed in the drum and swingable between an open and a closed position relative to the drum surface for clamping the trailing end of the sheet against the drum surface, second operating means for selectively driving the second clamping means to its open or closed position, sheet combing means movable toward or away from the drum surface for urging the sheet against the drum surface as the sheet is being disposed around the drum, and load means serving to assure the rotational speed of the drum remains constant during actuation of said first clamping means between its open and closed positions by varying the inertial load applied to the support shaft of the drum.

27. A sheet clamping device according to claim 25 or 26 in which the load means comprises a load cam fixedly mounted on the support shaft of the drum, a cam follower disposed for abutment against the load cam, and drive means for causing the cam follower to abut against the load cam with a selective force whereby the inertial load applied to the support shaft of the drum may remain relatively constant during actuation of said first clamping means.

28. A sheet clamping device according to claim 27 in which the drive means comprises a spring for imparting a bias of a reduced magnitude to the cam follower, and a solenoid for stretching the spring to thereby impart a bias of an increased magnitude to the cam follower.

29. A sheet clamping device according to claim 25 or 26 in which the load means may also serve as a brake means for applying a braking force to the drum.

30. A sheet clamping device comprising a drum around which a sheet is to be disposed, drum drive means for driving the drum for rotation in a given direction, first swingable clamping means extending outwardly of the drum through a slit formed in the drum along a generatrix thereof and being swingable between an open and a closed position relative to the drum surface for clamping the leading end of a sheet against the drum surface, operating means for selectively driving the clamping means to its open or closed position, second swingable clamping means extending outwardly of the drum through the slit formed in the drum and swingable between an open and a closed position relative to the drum surface for clamping the trailing end of the sheet against the drum surface, second operating means for selectively driving the second clamping means to its open or closed position, and sheet combing means movable toward or away from the drum surface for urging the sheet against the drum surface as the sheet is being disposed around the drum, said sheet combing means including means contacting the sheet at at least two points spaced circumferentially of the drum for holding the sheet in place while its trailing edge enters the second swingable clamping means.

31. A sheet clamping device according to claim 30, said last mentioned means being comprised by a member supported pivotally.

* * * * *